United States Patent [19]

Kawaguchi

[11] Patent Number: 4,738,019
[45] Date of Patent: Apr. 19, 1988

[54] WIRE STRIPPING AND AUTOMATIC WIRING DEVICE

[75] Inventor: Seiji Kawaguchi, Tokyo, Japan

[73] Assignee: Apollo Seiko, Ltd., Tokyo, Japan

[21] Appl. No.: 25,750

[22] Filed: Mar. 13, 1987

[30] Foreign Application Priority Data

Apr. 9, 1986 [JP] Japan .................................. 61-80221

[51] Int. Cl.⁴ .......................................... H01R 43/00
[52] U.S. Cl. .................................... 29/564.4; 29/755; 81/9.51
[58] Field of Search ................. 29/564.4, 566.1, 564.6, 29/564.7, 748, 755, 33 M, 564.8; 81/9.51

[56] References Cited

U.S. PATENT DOCUMENTS

| | | | |
|---|---|---|---|
| 3,895,426 | 7/1975 | Papsdorf | 29/564.4 X |
| 3,897,617 | 8/1975 | Ackerman et al. | 29/564.4 |
| 3,939,552 | 2/1976 | Hart et al. | 29/748 X |
| 3,947,943 | 4/1976 | Kokubo et al. | 29/755 |
| 4,091,695 | 5/1978 | Funcik et al. | 29/564.4 X |
| 4,275,619 | 6/1981 | Shimizu | 29/33 M |
| 4,361,942 | 12/1982 | Mazzola | 29/33 M |
| 4,554,725 | 11/1985 | Ouer | 29/564.4 |
| 4,584,912 | 4/1986 | Gudmestad et al. | 81/9.51 |
| 4,593,452 | 6/1986 | Keahei et al. | 29/755 X |
| 4,630,353 | 12/1986 | Okazaki et al. | 29/564.4 |

FOREIGN PATENT DOCUMENTS

| | | | |
|---|---|---|---|
| 57114 | 8/1982 | European Pat. Off. | 29/755 |
| 2129642 | 2/1979 | Fed. Rep. of Germany | 29/564.4 |

*Primary Examiner*—William R. Briggs
*Attorney, Agent, or Firm*—Schwartz & Weinrieb

[57] ABSTRACT

A wire stripping apparatus with a mechanism which cuts lead wire to a specified length, and peels off the covering of both ends of the wire before wiring it; through the attachment of a supply finger which conveys the wire to a predetermined position on the printed circuit board or similar for fixing, and positions it there, the device can supply the wire thus obtained to the next process. An automatic wiring device which can automatically perform wire coiling and soldering in a process continuous with the construction of said wiring by combining the work of this wire stripper with an automatic coiling and soldering device.

8 Claims, 8 Drawing Sheets

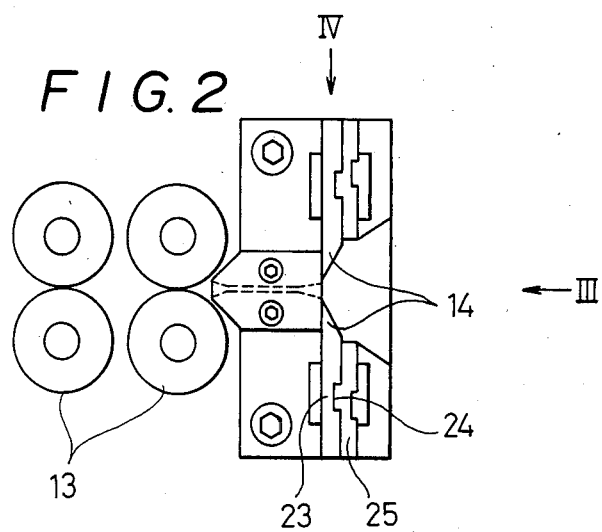
FIG.2
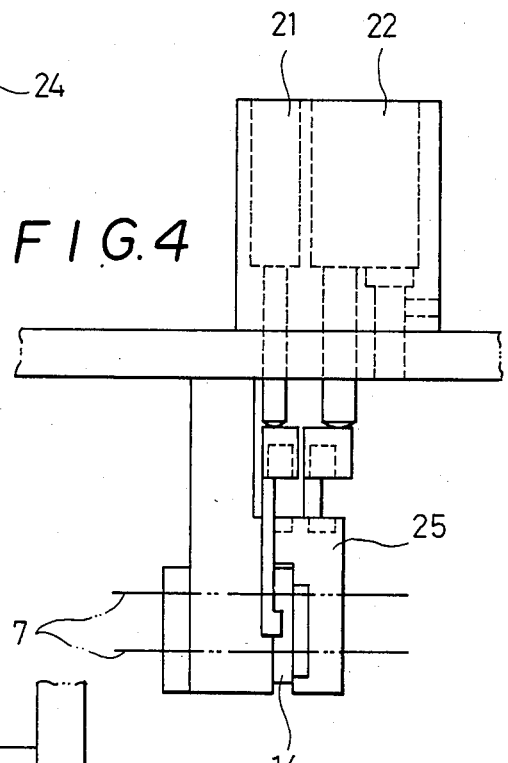
FIG.4
FIG.3
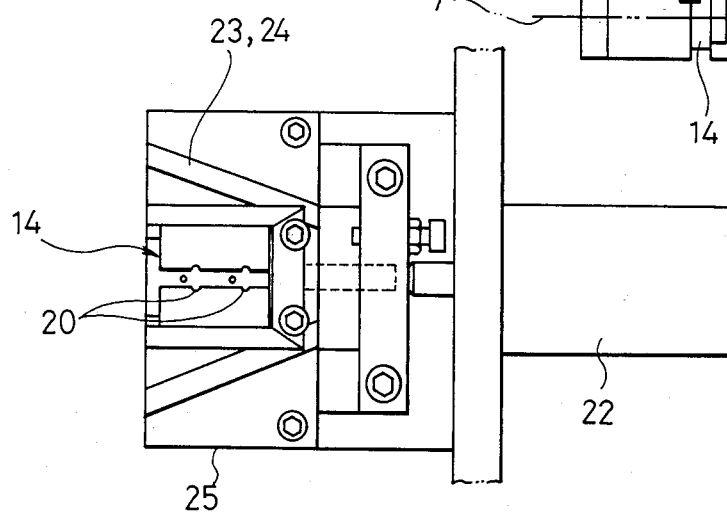

WIRE STRIPPING AND AUTOMATIC WIRING DEVICE

BACKGROUND OF THE INVENTION

This invention concerns a wire stripping apparatus and an automatic wiring device which incorporates it.

The wires used in wiring printed circuits boards and other wiring work consist of lead wire cut to specified lengths with the covering of both ends peeled off. Several so-called wire stripping apparatus which automatically supply this wire have already been proposed and are in actual use.

However previous wire stripping apparatus simply cut the lead wire and peeled off its covering and did not link the wire so obtained into the next process (for example soldering).

SUMMARY OF THE INVENTION

This invention, having noted the prior art, proposes a wire stripping apparatus which can be linked to soldering and wiring work, and an automatic wiring device which can automatically perform wiring operations through the linkage of that wire stripping apparatus to an automatic coiling and soldering device.

The other numerous features and profits of this invention will be outlined in the following description which refers to the attached drawings.

BRIEF DESCRIPTION OF THE DRAWINGS

FIG. 2 is a side view showing the construction of the area around the cutters.

FIG. 3 is a side view from the direction of arrow III in FIG. 2.

FIG. 4 is a plan view from the direction of arrow IV in FIG. 2.

PREFERRED EMBODIMENTS OF THE INVENTION

Figure 1:
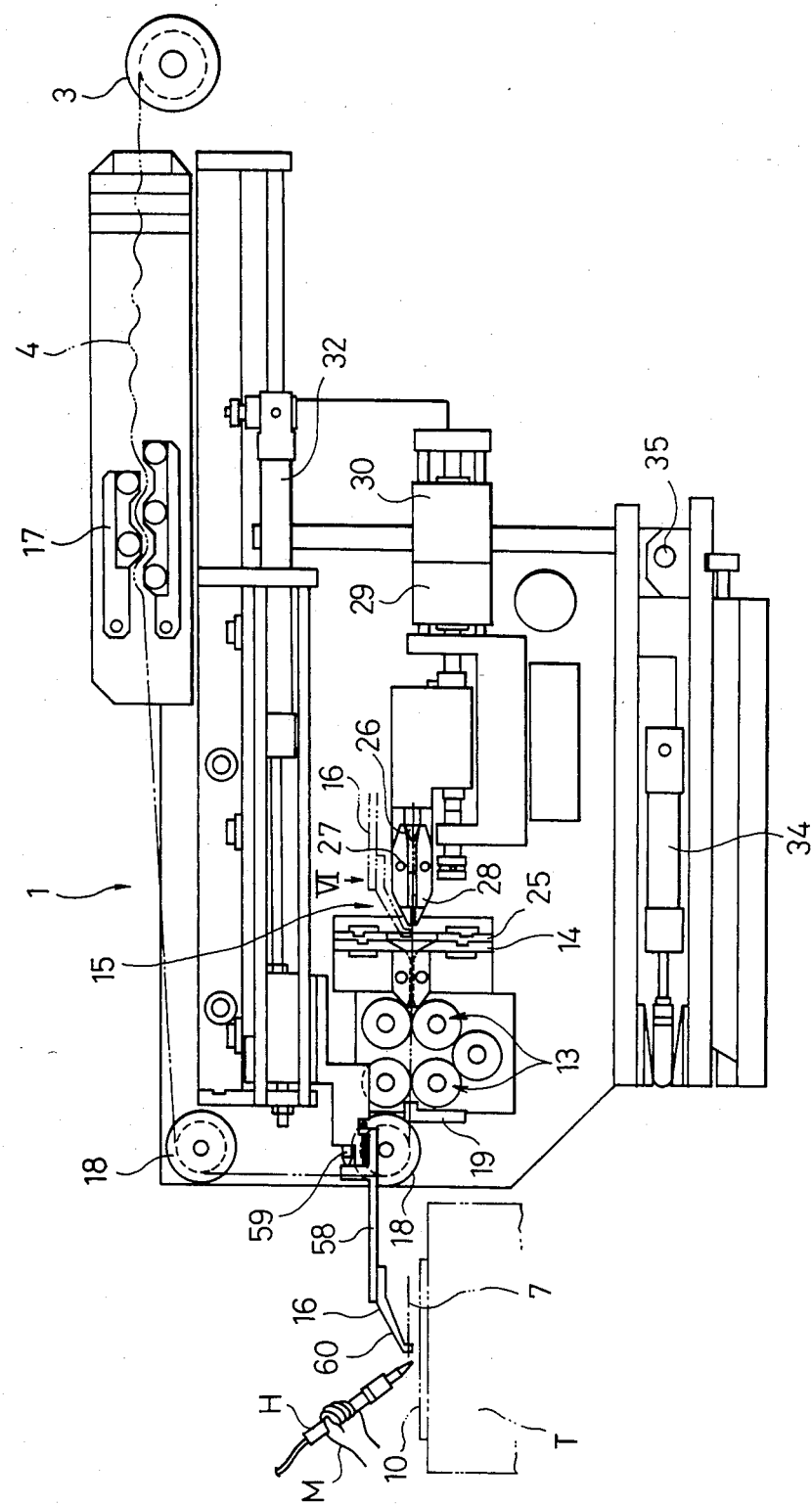
FIG. 1 is an overall side view of the wire stripping apparatus.

The following describes one embodiment of this invention with reference to drawings.

FIGS. 1 through 6 indicate one embodiment of this wire stripping apparatus. This wire stripping apparatus 1 is constructed of pinch rollers 13, cutters 14, a grip 15, and a supply finger 16. Two lead wires 4 are guided in parallel from the take up reel 3 into the apparatus, and first pass through the wire drawing unit 17. In this wire drawing unit 17, the lead wires 4 are squeezed top and bottom and the slack lead wires 4 are tensed. In addition to the wire drawing unit 17 which squeezes the wires top and bottom, another wire drawing unit may be added to squeeze in the horizontal direction. Also only one lead wire 4 may be guided in instead of two wires.

The direction of the lead wire 4 which has passed through the wire drawing unit 17 is transposed 180 degrees by the two feed rollers 18, and guided into the two sets of pinch rollers 13. These pinch rollers 13 can rotate forwards or backwards, and feed and rewind the lead wire 4 as required for cutting the said lead wires 4 or peeling off the covering 5 at both ends. The lead wires 4 are brought up between the upper and lower cutters 14 by the pinch rollers 13. 19 is a curve assising guide which by keeping the lead wire 4 fed by the pinch rollers 13 in an accurate position, ensures that the lead wire 4 does not bend after passing through the pinch rollers 13.

The cutting edges of these cutters 14 are constructed of two concave cutting parts 20 for peeling off the covering 5, at a fixed interval apart (FIG. 3). The size of these concave cutting parts 20 corresponds to the thickness of the conductor part 6 of the lead wire 4. The cutters 14 can slide horizontally and up and down using the slide cylinder 21, thus adjusting the position of a concave cutting part 20 in relation to the lead wire 4. These concave cutting parts 20 are used to peel off the wire covering 5, the lead wire 4 being cut in the places other than the concave cutting parts 20. These cutters 14 are moved up and down by the cutting cylinder 22. In other words, each cutter 14 has a sloping concave part 23, and the cutter moves up and down as the cutting cylinder 22 moves the frame 25 which makes a convex part 24 that fits into this concave part 23, in a forwards-backwards movement (in the left to right direction in FIG. 3).

The grip 15 closes the ends of its claws 28 to grip the lead wire 4 through the insertion of the arrowhead piston 26 between the rear end of the pair of claws 28 which rotate around a fulcrum as being a center 27. Further, the grip 15 can be moved into three positions (a), (b), (c), shown in FIGS. 5 (A) through (H), forwards or backwards in relation to the cutters 14 through the action the two back-to-back cylinders 29 and 30.

The supply finger 16 grips the wire 7 through the insertion of another piston 59 with the same shape as the said piston 26 between the pair of opposing support arms 58 which rotate around a fulcrum, thus opening and closing the pair of fingers 60 provided on the tips of those supply arms 58, in the same manner as the grip 15 above.

The following paragraphs describe the operation of these cutters 14 and the grip 15 which is adjacent to the cutters 14, in cutting a lead wire 4 and peeling its covering 5, with reference to FIGS. 5(A) through 5(H).

(1) A specified length of lead wire 4 is fed by the forward rotation of the pinch rollers 13 and its leading edge (one end) is positioned between the upper and lower cutters 14. At this time the cutters 14 are adjusted so that a concave cutting part 20 is aligned with the lead wire 4. At this point the grip 15 is in position (a) (FIG. 5(A)).

(2) The cutters 14 move up and down to cut only the covering 5 of one end of the lead wire 4. (FIG. 5(B).

Figure 5A:
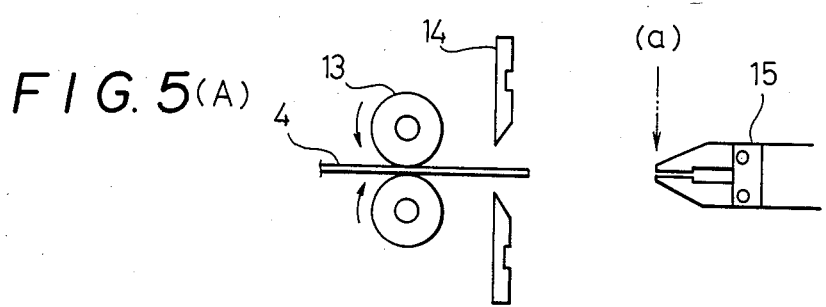
FIGS. 5(A) through 5(H) are side views showing the cutting and cover-peeling of the lead wire.
Figure 5B:
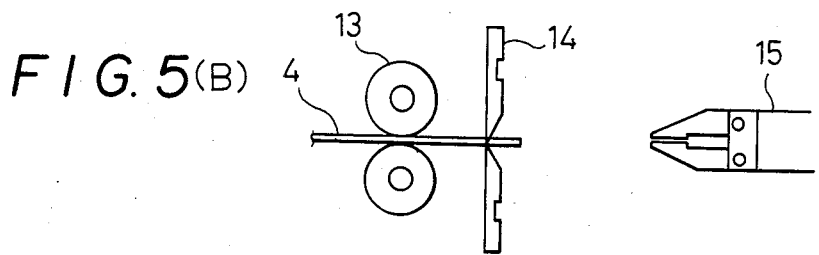
Figure 5C:
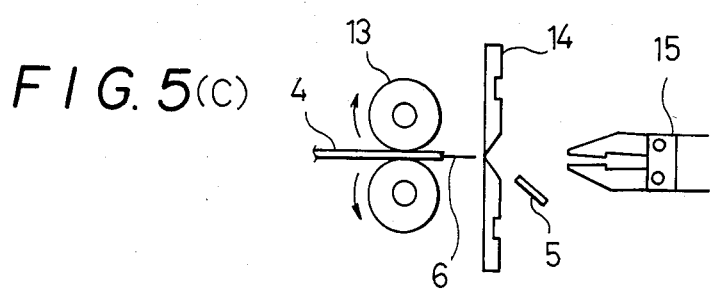
Figure 5D:
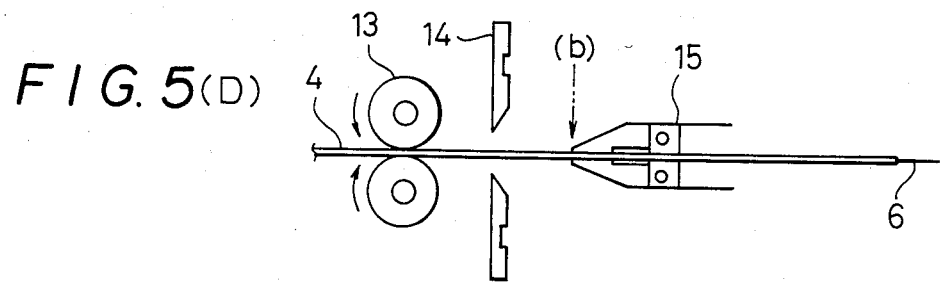
Figure 5E:
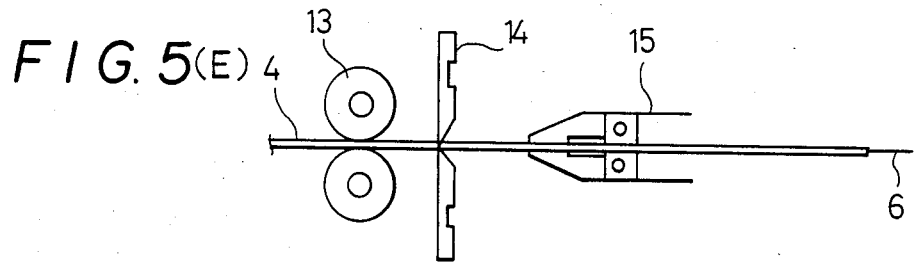

(3) The pinch rollers 1 rotate in the reverse direction, moving the lead wire 4 slightly to the left in FIG. 5(C), peeling off the covering 5 which was just cut, and exposing one end of the conductor part 6. (FIG. 5(C)).

(4) The pinch rollers 13 rotate forwards and feed the required amount of lead wire 4. Then the grip 15 slides horizontally—to the left in FIG. 5(D)—and grips and holds the fed lead wire 4 in position (b). At this point the cutters 14 have already slid horizontally so that a part other than the concave cutting part 20 is aligned with the lead wire 4. It is always possible to line these up no matter what length of wire has been fed, because the direction of the lead wire 4 has been transposed 180 degrees by the feed rollers 18 (FIG. 5(D).)

(5) The cutters 14 move up and down and cut the lead wire 4 in the middle (the opposite end to the said leading edge). Immediately after cutting the cutters 14 slide horizontally, to align a concave cutting part 20 with the lead wire 4. (FIG. 5(E)).

Figure 5F:
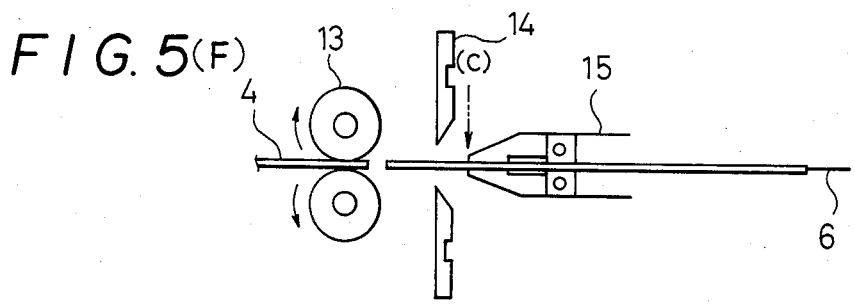
Figure 5G:
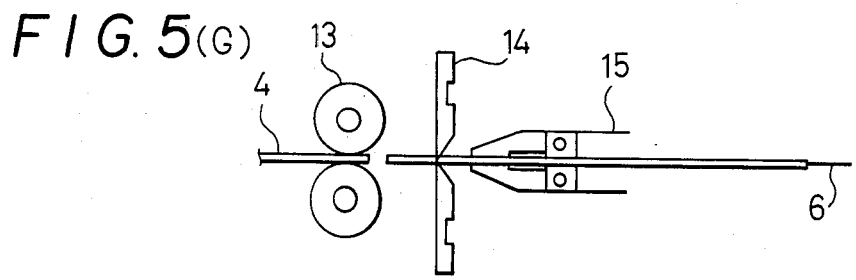
Figure 5H:
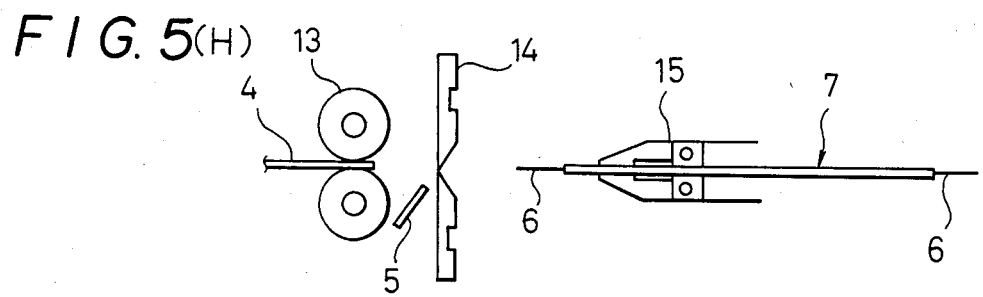
Figure 6:
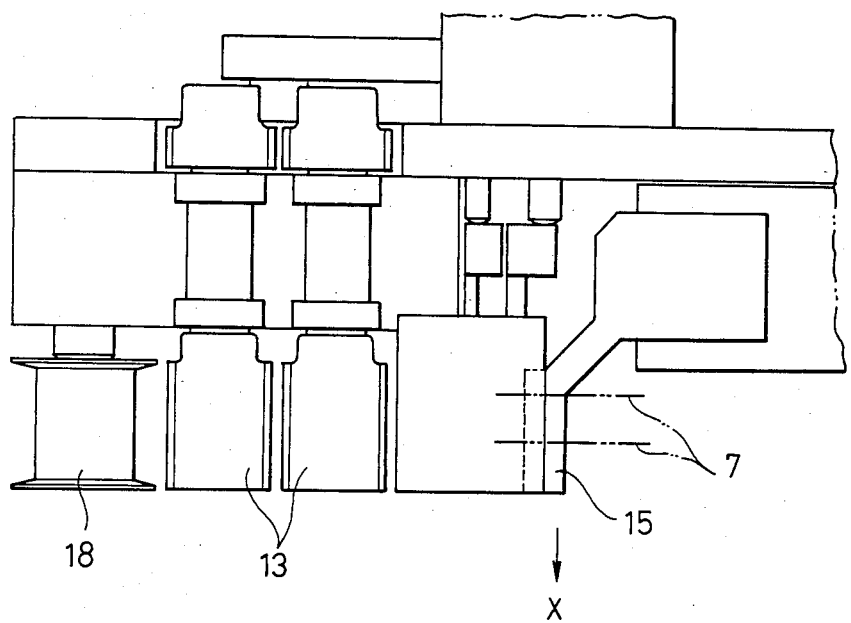
FIG. 6 is a plan view from the direction of the arrow VI in FIG. 1.
Figure 8:
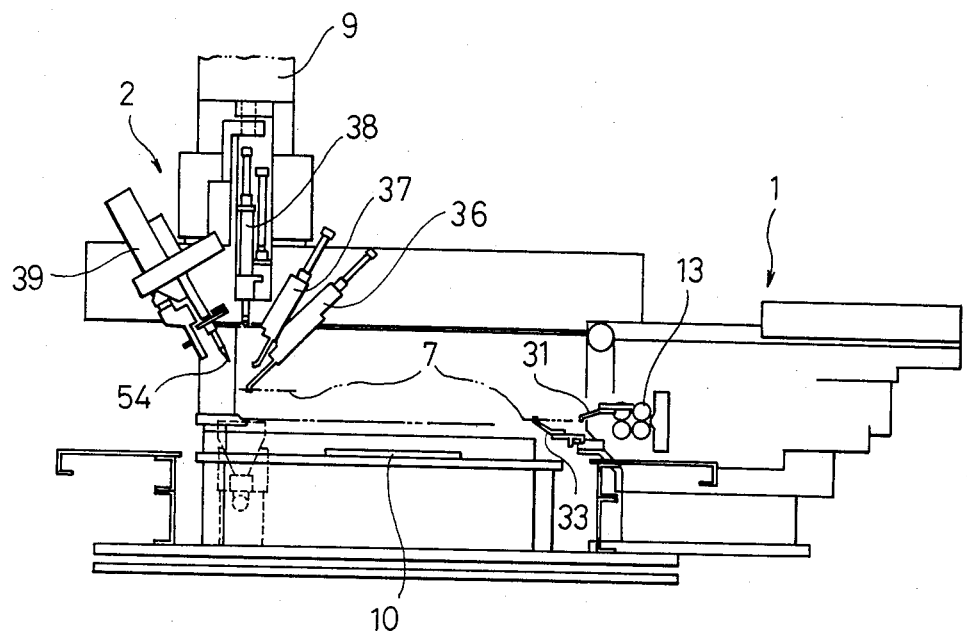
FIG. 8 is a side view of the automatic wiring device shown in FIG. 7.
Figure 7:
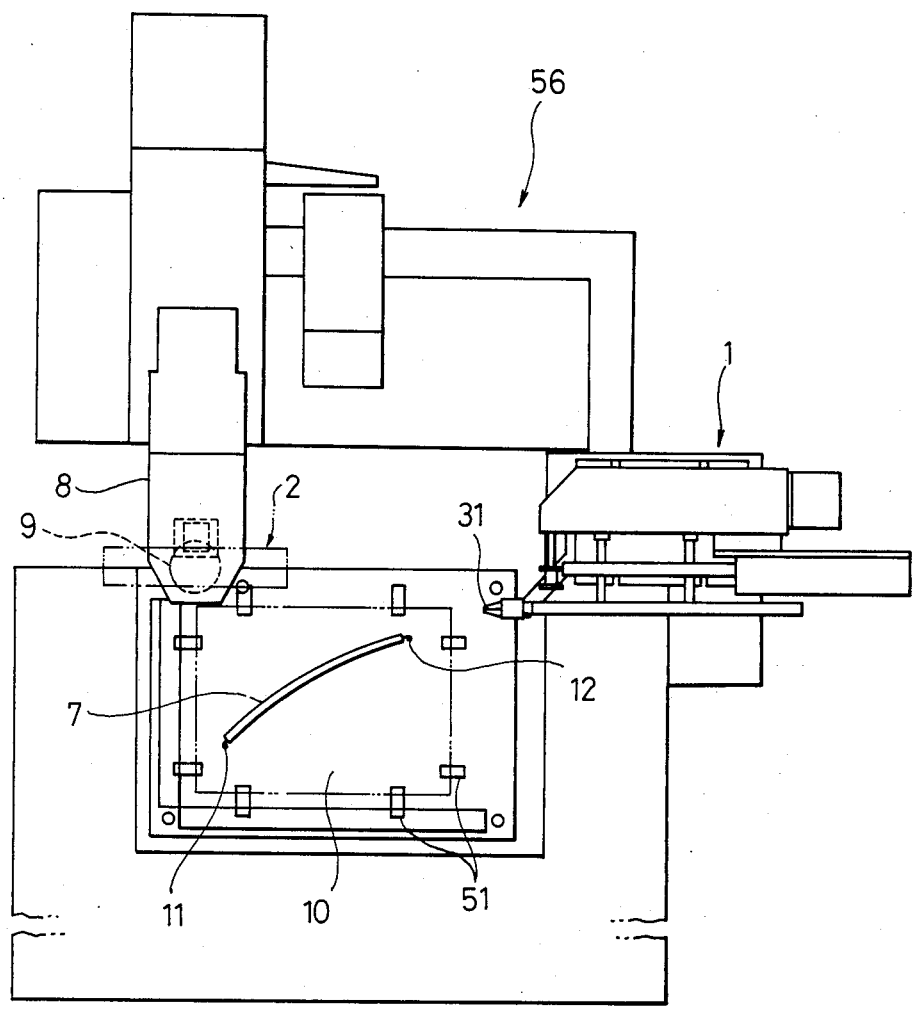
FIG. 7 is a plan view of the automatic wiring device.
Figure 9:
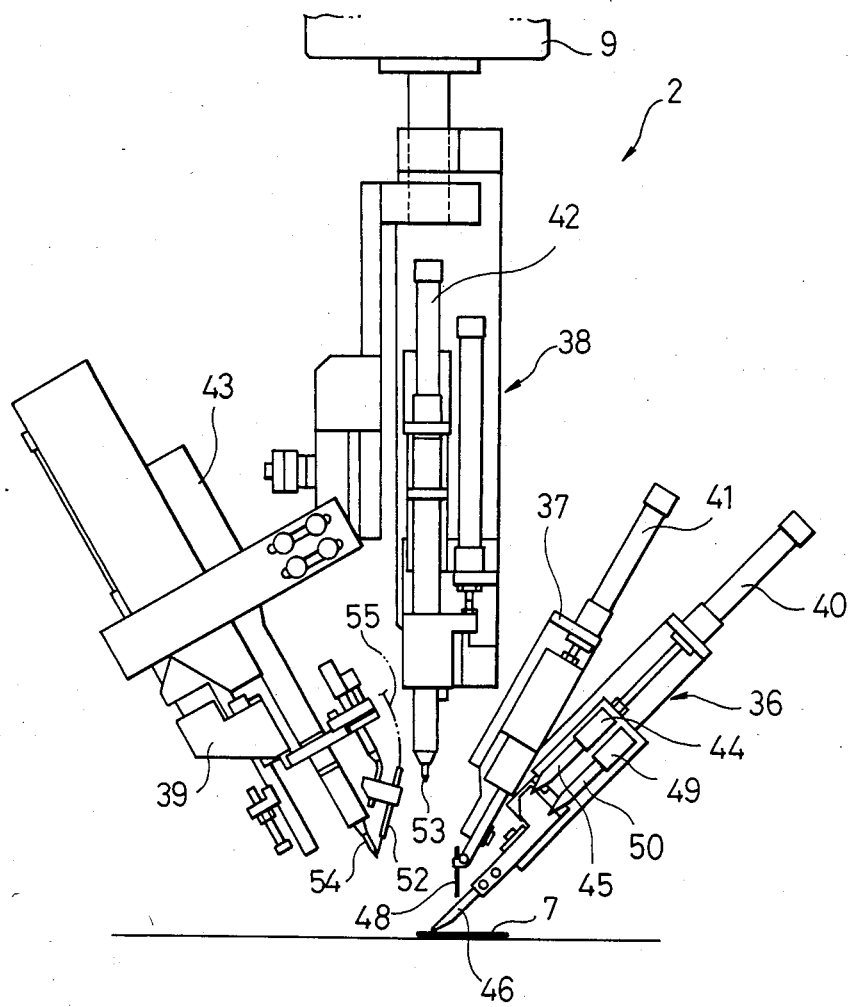
FIG. 9 is an overall side view of the automatic coiling and soldering device.
Figure 10:
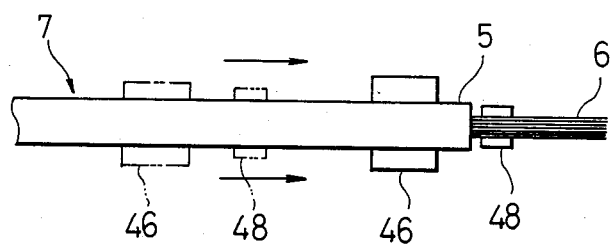
FIG. 10 is an enlarged view of the wiring showing the conductor part of the lead wire as detected by the sensor finger.

(6) The grip 15 slides slightly horizontally—to the left in FIG. 5(F)—to position (c), and the other end of the cut lead wire 4 is positioned between the cutters 14. (FIG. 5(F)).

(7) The cutters 14 move up and down and cut only the covering 5 of the other end of the lead wire 4. (FIG. 5(G)).

(8) The grip 15 draws back to position (a), peeling off the covering 5 which was just cut, and exposing the conductor part 6 of the other end of the lead wire. At this point the desired wiring 7 has been obtained (FIG. 5(H)).

The above described the cutting of a lead wire 4 and the peeling of its covering 5 by the cutters 14 and the grip 15. When two lead wires 4 are fed simultaneously from the take-up reel 3, the grip 15 slides horizontally in the direction of arrow X in FIG. 6 holding the two wires 7 thus simultaneously derived. The supply finger 16 slides backwards through the action of the cylinder 32 and takes hold of the wires 7 which are held by this horizontally sliding grip 15, then returning to the forward position. At this point the wire 7 is accurately positioned on the printed circuit board 10 which is mounted on top of the work table T which is joined to the wire stripping apparatus 1; because the worker M is not required to position the wire on the printed circuit board 10, no mistakes are made in positioning the wire for soldering and manual soldering work can be carried out continuously using the soldering iron H. Further as described above it is also possible to fix the wire 7 positioned by the supply finger 16 using an automatic device instead of manually. At the bottom of the device there is a cylinder 34, and by moving this cylinder 34 backwards and forwards the whole device can be made to rotate obliquely around a rotational hinge 35, thus adjusting the vertical position of the tips of the supply finger 16.

As described the wire stripping apparatus 1 is provided with horizontally sliding cutters 14 with concave cutting parts 20 in the cutting edge. By sliding these cutters 14 horizontally, the concave cutting part 20 is aligned with the lead wire 4 and only the covering 5 of the lead wire 4 can be cut, or the lead wire 4 itself can be cut by lining it up with a part other than the concave cutting part 20. Therefore, the cutters 14 can move together with the grip 15 which holds the lead wire 4 and moves backward and forwards in relation to the cutters 14, thus cutting the lead wire 4 into specified lengths. Then, by peeling off the covering 5 of both ends of the lead wire 4, the desired jumper wire 7 can be created from a continuous lead wire 4. Also the supply finger 16 can move up to the grip 15 to take the wire 7 obtained in this way, and carry it to, and position it so as to facilitate the next process.

Next, one embodiment of the automatic wiring device will be described with reference to the FIGS. 7 through 13. This automatic wiring device 56 consists of a wire stripping apparatus 1 and an automatic coiling and soldering device 2. The wire stripping apparatus 1 has almost the same construction as the embodiment just described, but in this embodiment the supply finger 16 of the wire stripping apparatus 1 is constructed of an upper finger 31 which is moved forwards and backwards by cylinder 32 and a lower finger 33. The jumper wire 7 to be "wired", which has been positioned and held by the upper finger 31 is passed to the lower finger 33. In this operation, the whole device inclines forwards in the center from the hinge 35 through the movement of the cylinder 34 provided on the lower part of the device, to pass the wire from the upper finger 31 to the lower finger 33. At this point, the aforementioned automatic coiling and soldering device 2 switches into ready status. The construction of the upper and lower fingers 31 and 33 is almost identical to the supply finger 16 just described, so their description has been omitted.

Further, the automatic coiling and soldering device 2 mounted on the head 9 of a freely movable and rotatable robot arm 8, can be used to coil the exposed conductor parts 6 of both ends of the jumper wire 7 around the pins 11 and 12 in the two places on the printed circuit board 10 at which they are to be soldered, and then solder them there. For wiring design reasons, or to make improvements to an existing printed circuit board, the wiring printed on the printed circuit board may indicate the connection by the lead wire of a certain two mutually separated pins on the printed circuit board. This connection is usually called "jumper wiring" and it can be performed automatically by the automatic coiling and soldering device 2.

The entire automatic coiling and soldering device 2 is mounted on the head 9 of a freely movable and freely rotatable robot arm 8, and comprises a setting finger 36, an sensor finger 37, a wrapping mechanism 38 and a soldering mechanism 39. Each of these move up and down independently via individually provided cylinders 40, 41, 42, and 43, which radiate out from the wrapping mechanism 38 mounted in the center.

Then the whole automatic coiling and soldering device 2 moves towards the wire stripping apparatus 1 through the movement of the robot arm 8, and one end of the jumper wire 7 which was held by the lower finger 33 is transferred to the grip of the setting finger 36 as if the upper finger 31 was holding it.

Figure 11:
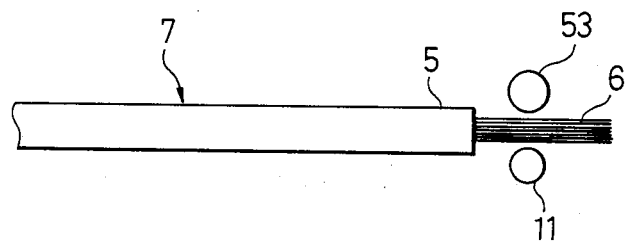
FIG. 11 is an enlarged plan view of the wiring showing the conductor part of the lead wire before it it coiled around the pin.
Figure 12:
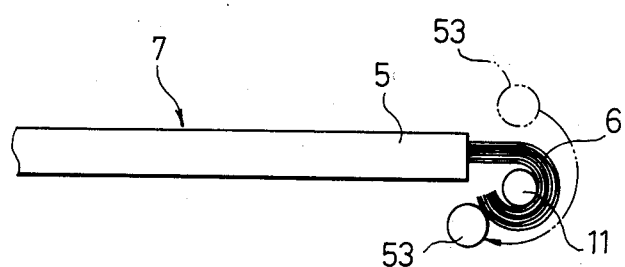
FIG. 12 is an enlarged plan view corresponding to FIG. 11 but with the wire coiled.
Figure 13:
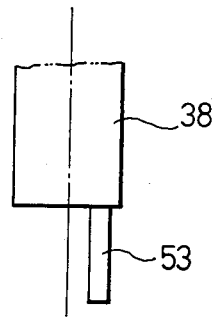
FIG. 13 shows an enlarged side view of the wrapping pin.

With the setting finger 36 holding one end of the jumper wire 7, the entire automatic coiling and soldering device 2 is moved by the robot arm 8 to the printed circuit board 10 which is fixed by the positioning tool 51, and the conductor part 6 of the jumper wire 7 is positioned right next to one of the pins 11 to be soldered. Next, the wrapping mechanism 38 is brought down and the conductor part 6 of the jumper wire 7 is caught between the wrapping pin 53 at the edge of the wrapping mechanism 38 and the pin 11 on top of the printed circuit board 10. (FIG. 11). The wrapping pin 53 is mounted in position off center from the front edge of the wrapping mechanism 38 (See FIG. 13). Thus the conductor part 6 is coiled around pin 11 by the rotation of the wrapping pin 53 in the specified direction i.e. its rotation as if around the circumference of pin 11 (See FIGS. 11 and 12).

Once the conductor part 6 has been coiled around the pin 11, the soldering mechanism 39 descends and the solder iron tip 54 is pushed up to touch pin 11 around which the conductor part 6 is coiled. Thread solder 55 is automatically supplied from a supply nozzle 52 to the iron tip 54 and soldering is performed automatically. This completes the soldering of one end of the jumper wire 7.

Next, the head 7 rotates 180 degrees to face the reverse direction, and the setting finger 36 descends together with the sensor finger 37 and lightly grips the the jumper wire 7 of which one end has already been soldered, at the opposite end from which it was previously held. This light grip is obtained by the shallow inserting of the arrowheaded piston 45 of the cylinder 44 between the rear ends of the claws 46. At this point, the sensor finger 37 descends and lightly grips the wire 7 together with the setting finger 36 but slightly towards the front of the wire. Then, both this sensor finger 37 and the setting finger 36 slide quickly, together still holding the jumper wire 7, towards a position forward of the opposite end of the jumper wire 7. Close to the conductor part 6 of the other end, the the sliding motion is slowed, and when the sensor finger 37 reaches part of the conductor part 6 (See FIG. 10), the claw 48 of the sensor finger 37 passes the conductor part 6 of the other end of the jumper wire 7, thus detecting its position. Once its position is detected, a signal is transmitted to a control part not shown in the diagram and the arrowheaded piston 50 of the another cylinder 49 in the setting finger 36 is inserted, this time with force, deep between the ends of the claws 46. Then the ends of the claws 46 close, holding the other end of the jumper wire 7 tightly in a fixed position. Once the setting finger 36 has a tight hold on the jumper wire 7, the role of the sensor finger 37 is complete, and it is lifted away.

After that, the conductor part 6 of jumper wire 7 is positioend right next to pin 12 which has not yet been soldered and is then coiled and solder as outlined above. This completes the wiring of the jumper wire 7.

In the above description, the position of the conductor part 6 was detected using the sensor finger 37; however, an optical sensor can also be used, or the slide distance of the setting finger 36 can be matched in advance with the length of the jumper wire 7, and the device set up to slide only that fixed distance to grip the other end of the jumper wire 7.

As described above, in the automatic wiring device 56, the whole automatic coiling and soldering device 2 is moved up to the wire stripping apparatus 1 via the robot arm 8, and the setting finger 36 of the automatic coiling and soldering device 2 moves to take the wire 7 which has been positioned using the supply finger 16 of the said wire stripping apparatus 1. Once the setting finger 36 has gripped one end of the jumper wire 7, the whole automatic coiling and soldering device 2 is moved on its robot arm 8, and the conductor part 6 at one end of the jumper wire 7 is positioned by the setting finger 36 at the pin 11 to be soldered on the printed circuit board 10. The conductor part 6 which has been positioned next to the pin 11 is coiled around the pin through the circular rotation of the wrapping pin 53 of the wrapping mechanism 38. Once the coiling of the conductor part 6 is completed, that part is soldered by the soldering mechanism 39. Then the jumper wire 7 is transferred to the grip of the setting finger 36, which while still holding it, slides quickly along to detect the conductor part 6 at the other end, gripping it in a specified location of the other end. In other words, this setting finger 36 lightly grips the jumper wire 7 and holding it, is slid quickly towards the vicinity of the other end, slowing its slide once it approaches the other end. When it detects the conductor part 6 of the jumper wire 7 the setting finger 36 tightly grips the jumper wire 7. Therefore, the setting finger 36 can detect the position of the other end of the jumper wire 7 and can always grip it at a specified location. Then the conductor part 6 of the other end is positioned at the other pin 12 to be soldered, and is coiled and soldered in the same manner. In this way, the two pins 11 and 12 which are to be soldered are connected by soldering jumper wire 7, completing the wiring operation.

Therefore, since the wire stripping apparatus of this invention can automatically supply the wire necessary for wiring work by cutting a continuous lead wire and peeling its covering, and can also convey the wire thus obtained to a fixed position and position it there, a worker can work continuously without needing to position the wire.

Further, since the automatic wiring device can solder a wire obtained from the wire stripping apparatus to any two pins on the printed circuit board, wiring work such as jumper wire wiring which could previously be performed only manually can now be performed automatically, acccurately and quickly.

I claim:

1. A wire stripping apparatus which cuts a lead wire to an appropriate length and peels off its covering at both ends and wires it, characterized by being provided with forward and backward rotating pinch rollers which can intermittently feed lead wire from, and return it to, a take-up reel, a pair of horizontally sliding cutters which have a concave cutting part of a size corresponding to the thickness of conductor part of the lead wire, and can peel off the covering of one end of the lead wire fed by the pinch rollers, cut the lead wire in the middle and peel off the covering of other end of the lead wire obtained by that middle cut, a grip which is freely moving in relation to the cutters while gripping the lead wire cut by the cutters, and a supply finger which takes from the said grip the lead wire whose covering has been peeled from both ends and grips it, and conveys it to and positions it at a specified position.

2. The wire stripping apparatus of claim 1 which between the take-up reel and the pinch rollers is provided with a wire drawing unit which squeezes the lead wire taken from the take-up reel and tenses the slackened lead wire.

3. The wire stripping apparatus of claim 1, having a grip whose pair of claws which are freely rotating around a fulcrum as being a center, close through the insertion of an arrowheaded piston between the rear part of those claws, thus gripping the lead wire.

4. The wire stripping apparatus of claim 1, having a supply finger whose pair of fingers attached at the tips of support arms close and grip the wire through the insertion of an arrowheaded piston between the support arms which are freely rotating around a fulcrum as being a center.

5. An automatic wiring device characterized by being a single unit combining a wire stripping apparatus which can cut an appropriate length of lead wire and peel off the covering of both ends for wiring, provided with pinch rollers which rotate forwards and backwards to intermittently feed out and return lead wire obtained from a take-up reel, a horizontally sliding pair of cutters having a concave cutting part of a size corresponding to the thickness of the conductor part of the lead wire, which can ppel off the covering of one end of the lead wire fed by the said pinch rollers, cut the lead wire in the middle and peel off the covering of the other end of the lead wire obtained by that middle cut, a grip which can advance and retreat in relation to the cutters while gripping the lead wire cut by the cutters, and a supply finger which takes the lead wire made into a wire having the covering of both ends peeled off from the said grip, grips it and conveys it to a specified location where it is positioned; and with that wire stripping apparatus, an automatic coiling and soldering device provided with a setting finger which grips both ends of the wire positioned by the supply finger of the wire stripping apparatus and positions both the exposed ends of the wire in the respective positions at which they are to be soldered, i.e. the pins protruding at two locations from the printed circuit board, a wrapping mechanism which has a circularly rotating wrapping pin at the front which is used to coil the conductor part of the wire around the pins which protrude from the printed circuit board, and a soldering mechanism which while continuously supplying thread solder to a soldering iron solders the conductor coiled around the pins by the wrapping mechanism.

6. The automatic wiring device of claim 5 which is provided with a wrapping mechanism having a wrapping pin mounted off-center at the front which rotates in a circular motion while pressing on the outside of the conductor of the wire to coil it around the pin which projects from the printed circuit board.

7. The automatic wiring device of claim 5 in which a setting finger, a wrapping mechanism, a soldering mechanism, and a sensor finger are mounted independently on individual cylinders which radiate from the central wrapping mechanism and move freely up and down.

8. The automatic wiring device of claim 7 which has a sensor finger which together with a setting finger lightly grips the wire of which one conductor end has been previously coiled around a pin which protrudes from the printed circuit board, and in that position with the sensor finger lightly gripping a part slightly towards the other end in relation to the part gripped by the setting finger, together with the setting finger slides quickly towards the other end of the wire, sliding more slowly once approaching the conductor part at the other end, and finally once detecting the conductor part of the other end, sending a signal to the setting finger which strongly grips the other end of the wire in a fixed position, the sensor finger then moving upwards away from the wiring.

* * * * *